United States Patent
Zhao et al.

(10) Patent No.: US 11,987,265 B1
(45) Date of Patent: May 21, 2024

(54) AGENT TRAJECTORY PREDICTION USING TARGET LOCATIONS

(71) Applicant: Waymo LLC, Mountain View, CA (US)

(72) Inventors: Hang Zhao, Sunnyvale, CA (US); Jiyang Gao, San Jose, CA (US); Chen Sun, Great Neck, NY (US); Yi Shen, Sunnyvale, CA (US); Yuning Chai, San Mateo, CA (US); Cordelia Luise Schmid, Saint Ismier (FR); Congcong Li, Cupertino, CA (US); Benjamin Sapp, Marina del Rey, CA (US); Dragomir Anguelov, San Francisco, CA (US); Tian Lan, Sunnyvale, CA (US); Yue Shen, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 77 days.

(21) Appl. No.: 17/387,852

(22) Filed: Jul. 28, 2021

Related U.S. Application Data (60) Provisional application No. 63/057,717, filed on Jul. 28, 2020.

(51) Int. Cl.
  *B60W 60/00* (2020.01)
  *G06N 3/02* (2006.01)
(52) U.S. Cl.
  CPC .......... *B60W 60/001* (2020.02); *G06N 3/02* (2013.01); *B60W 2420/42* (2013.01); *B60W 2554/4049* (2020.02)
(58) Field of Classification Search
  CPC ......... B60W 50/0097; B60W 2420/42; B60W 60/001; B60W 60/0027; B60W 60/00272;
  (Continued)

(56) References Cited

U.S. PATENT DOCUMENTS 10,102,750 B2   10/2018   Aso et al.
2018/0189578 A1*  7/2018   Yang ................... G06V 10/457
(Continued)

FOREIGN PATENT DOCUMENTS

CN        110415266       11/2019
WO    WO 2018/232680     12/2018

OTHER PUBLICATIONS

Alahi et al., "Social LSTM: Human Trajectory Prediction in Crowded Spaces," Proceedings of the IEEE Conference on Computer Vision and Pattern Recognition, 2016, pp. 961-971.
(Continued)

*Primary Examiner* — Russell Frejd
*Assistant Examiner* — Brandon Z Willis
(74) *Attorney, Agent, or Firm* — Fish & Richardson P.C.

(57) ABSTRACT

A system obtains scene context data characterizing the environment. The scene context data includes data that characterizes a trajectory of an agent in a vicinity of a vehicle up to a current time point. The system identifies a plurality of initial target locations, and generates, for each of a plurality of target locations that each corresponds to one of the initial target locations, a respective predicted likelihood score that represents a likelihood that the target location will be an intended final location for a future trajectory of the agent. For each target location in a first subset of the target locations, the system generates a predicted future trajectory for the agent given that the target location is the intended final location for the future trajectory. The system further selects, as likely future trajectories of the agent, one or more of the predicted future trajectories.

18 Claims, 4 Drawing Sheets

(58) Field of Classification Search
CPC ....... B60W 60/00274; B60W 2554/40; B60W 2554/4023; B60W 2554/4026; B60W 2554/4029; B60W 2554/4045; B60W 2554/4041; B60W 2554/4049; B60W 2554/4042; B60W 2554/4043; B60W 2554/4044; G06N 3/02

See application file for complete search history.

(56) References Cited

U.S. PATENT DOCUMENTS

| | | | |
|---|---|---|---|
| 2019/0025841 A1* | 1/2019 | Haynes | G05D 1/0214 |
| 2019/0369637 A1 | 12/2019 | Shalev-Shwartz et al. | |
| 2020/0110416 A1* | 4/2020 | Hong | G01C 21/3602 |
| 2020/0156632 A1 | 5/2020 | Ding et al. | |
| 2020/0307562 A1* | 10/2020 | Ghafarianzadeh | G06V 40/25 |
| 2021/0139024 A1* | 5/2021 | Crego | G08G 1/166 |
| 2021/0370980 A1* | 12/2021 | Ramamoorthy | G06F 18/295 |
| 2021/0402991 A1* | 12/2021 | Gautam | B60W 30/0956 |

OTHER PUBLICATIONS

Broadhurst et al., "A prediction and planning framework for road safety analysis, obstacle avoidance and driver information," Carnegie Mellon University, the Robotics Institute, 2004, 31 pages.

Casas et al., "Intentnet: Learning to predict intention from raw sensor data," Proceedings of The 2nd Conference on Robot Learning, 2018, 87:947-956.

Chai et al., "Multipath: Multiple probabilistic anchor trajectory hypotheses for behavior prediction," CoRR, Oct. 2019, arxiv.org/abs/1910.05449, 14 pages.

Colyar et al., "Us highway 101 dataset," Next Generation Simulation, Jan. 2007, 3 pages.

Cui et al., "Multimodal trajectory predictions for autonomous driving using deep convolutional networks," 2019 International Conference on Robotics and Automation, May 2019, 7 pages.

Gao et al., "VectorNet: Encoding HD Maps and Agent Dynamics from Vectorized Representation," CoRR, May 2020, arxiv.org/abs/2005.04259, 9 pages.

Gupta et al., "Social GAN: Socially acceptable trajectories with generative adversarial networks," Proceedings of the IEEE Conference on Computer Vision and Pattern Recognition, 2018, pp. 2255-2264.

He et al., "Deep residual learning for image recognition," Proceedings of the IEEE Conference on Computer Vision and Pattern Recognition, 2016, pp. 770-778.

Helbing et al., "Social force model for pedestrian dynamics," Physical Review E 51, (5):4282.

Hong et al., "Rules of the road: Predicting driving behavior with a convolutional model of semantic interactions," Proceedings of the IEEE/CVF Conference on Computer Vision and Pattern Recognition, 2019, pp. 8454-8462.

Kingma et al., "Adam: A method for stochastic optimization," CoRR, Jan. 2017, arXiv:1412.6980, 15 pages.

Kingma et al., "Auto-encoding variational bayes," CoRR, Dec. 2013, arXiv:1312.6114, 14 pages.

Kitani et al., "Activity forecasting," European Conference on Computer Vision, 2012, pp. 201-214.

Krajewski et al., "The highD dataset: A drone dataset of naturalistic vehicle trajectories on German highways for validation of highly automated driving systems," 2018 21st International Conference on Intelligent Transportation Systems, Nov. 2018, 8 pages.

Lambert et al., "Argoverse: 3d tracking and forecasting with rich maps," Proceedings of the IEEE/CVF Conference on Computer Vision and Pattern Recognition, 2019, pp. 8748-8757.

Lee et al., "DESIRE: Distant future prediction in dynamic scenes with interacting agents," Proceedings of the IEEE Conference on Computer Vision and Pattern Recognition, 2017, pp. 336-345.

Ma et al., "Forecasting interactive dynamics of pedestrians with fictitious play," Proceedings of the IEEE Conference on Computer Vision and Pattern Recognition, 2017, pp. 774-782.

Mangalam et al., "It is not the journey but the destination: Endpoint conditioned trajectory prediction," European Conference on Computer Vision, Nov. 2020, 19 pages.

Phan-Minh et al., "CoverNet: Multimodal behavior prediction using trajectory sets," Proceedings of the IEEE/CVF Conference on Computer Vision and Pattern Recognition, 2020, pp. 14074-14083.

Rehder et al., "Goal-directed pedestrian prediction," Proceedings of the IEEE International Conference on Computer Vision (ICCV) Workshops, 2015, pp. 50-58.

Rehder et al., "Pedestrian prediction by planning using deep neural networks," 2018 IEEE International Conference on Robotics and Automation, May 2018, 9 pages.

Rezende et al., "Variational inference with normalizing flows," Proceedings of the 32nd International Conference on Machine Learning, 2015, 37:1530-1538.

Rhinehart et al., "PRECOG: Prediction conditioned on goals in visual multi-agent settings," Proceedings of the IEEE/CVF International Conference on Computer Vision, 2019, pp. 2821-2830.

Rhinehart et al., "R2P2: A reparameterized pushforward policy for diverse, precise generative path forecasting," Proceedings of the European Conference on Computer Vision, 2018, pp. 772-788.

Robicquet et al., "Forecasting social navigation in crowded complex scenes," CoRR, Jan. 2016, arxiv.org/abs/1601.00998, 16 pages.

Sadeghian et al., "Sophie: An attentive gan for predicting paths compliant to social and physical constraints," Proceedings of the IEEE Conference on Computer Vision and Pattern Recognition, 2019, pp. 1349-1358.

Salimans et al., "Improved techniques for training GANs," 30th Conference on Neural Information Processing Systems, 2016, 9 pages.

Sun et al., "Stochastic prediction of multi agent interactions from partial observations," CoRR, Feb. 2019, arxiv.org/abs/1902.09641, 15 pages.

Tang et al., "Multiple futures prediction," 33rd Conference on Neural Information Processing Systems, 2019, 11 pages.

Tsubouchi et al., "Behavior of a mobile robot navigated by an 'iterated forecast and planning' scheme in the presence of multiple moving obstacles," Proceedings of the 1994 IEEE International Conference on Robotics and Automation, May 1994, 6 pages.

Williams et al., "A learning algorithm for continually running fully recurrent neural networks," Neural Computation, Jun. 1989, 1(2):270-280.

Yeh et al., "Diverse generation for multi-agent sports games," Proceedings of the IEEE/CVF Conference on Computer Vision and Pattern Recognition, 2019, pp. 4610-4619.

Yuan et al., "Diverse trajectory forecasting with determinantal point processes," CoRR, Dec. 2019, arxiv.org/abs/1907.04967, 15 pages.

Zhan et al., "Generative multi-agent behavioral cloning," Generative Multi-Agent Behavioral Cloning, 2018, 12 pages.

Zhan et al., "INTERACTION Dataset: An INTERnational, Adversarial and Cooperative moTION Dataset in Interactive Driving Scenarios with Semantic Maps," CoRR, Sep. 2019, arXiv:1910.03088, 13 pages.

Zheng et al., "Generating long-term trajectories using deep hierarchical networks," CoRR, Jun. 2017, arxiv.org/abs/1706.07138, 9 pages.

Ziebart et al., "Planning-based prediction for pedestrians," 2009 IEEE/RSJ International Conference on Intelligent Robots and Systems, Oct. 2009, 6 pages.

International Search Report and Written Opinion in International Appln. No. PCT/US2021/043541, dated Mar. 2, 2022, 10 pages.

International Preliminary Report on Patentability in International Appln. No. PCT/US2021/043541, dated Feb. 9, 2023, 7 pages.

* cited by examiner

AGENT TRAJECTORY PREDICTION USING TARGET LOCATIONS

CROSS-REFERENCE TO RELATED APPLICATION

This application claims priority to U.S. Provisional Patent Application No. 63/057,717, filed on Jul. 28, 2020, the disclosure of which is hereby incorporated by reference in its entirety.

BACKGROUND

This specification relates to predicting the future trajectory of an agent in an environment.

The environment may be a real-world environment, and the agent may be, e.g., a vehicle in the environment. Predicting the future trajectories of agents is a task required for motion planning, e.g., by an autonomous vehicle.

Autonomous vehicles include self-driving cars, boats, and aircraft. Autonomous vehicles use a variety of onboard sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an onboard camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on the input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make predictions in a production system.

SUMMARY

This specification describes a system implemented as computer programs on one or more computers in one or more locations that generates a trajectory prediction for an agent, e.g., a vehicle, a cyclist, or a pedestrian, in an environment. For example, the trajectory prediction may be made by an on-board computer system of an autonomous vehicle navigating through the environment and the agent may be an agent that has been detected by the sensors of the autonomous vehicle. The trajectory prediction identifies one or more likely future trajectories for the agent. A planning system of the vehicle can use the likely future trajectories for the agent to make planning decisions to plan a future trajectory of the vehicle, e.g., by generating or modifying the future trajectory to avoid collisions with any of the likely future trajectories of the agent.

In one innovative aspect, there is provided a method of predicting trajectories for an agent. The method is implemented by a system including one or more computers. The system obtains scene context data characterizing an environment. The scene context data includes data that characterizes a trajectory of an agent in a vicinity of a vehicle in an environment up to a current time point. The system identifies a plurality of initial target locations in the environment. The system further generates, for each of a plurality of target locations that each corresponds to one of the initial target locations, a respective predicted likelihood score that represents a likelihood that the target location will be an intended final location for a future trajectory of the agent starting from the current time point. For each target location in a first subset of the target locations, the system generates a predicted future trajectory for the agent that is a prediction of the future trajectory of the agent given that the target location is the intended final location for the future trajectory. The system further selects, as likely future trajectories of the agent starting from the current time point, one or more of the predicted future trajectories.

In some implementations, the scene context data further includes data that characterizes respective trajectories of one or more other agents in the environment up to the current time point.

In some implementations, the first subset of target locations is a proper subset of the plurality of target locations, and the system selects the first subset of target locations by selecting a threshold number of target locations having the highest respective predicted likelihood scores.

In some implementations, when identifying the plurality of initial target locations in the environment, the system divides a region of the environment that is in a vicinity of the agent into a grid having a plurality of grid points, and selects at least some of the grid points in the grid as initial target locations.

In some implementations, when identifying the plurality of initial target locations in the environment, the system obtains road graph data identifying lanes on one or more roads in the environment, and samples, as initial target locations, points from the identified lanes. In some implementations, when sampling points from the identified lanes, for each identified lane, the system samples points on a lane center line of the identified lane.

In some implementations, the system further processes the scene context data using a context encoding neural network to generate an encoded representation of the scene context data. In some implementations, when generating a predicted future trajectory for the agent, the system processes the encoded representation and data specifying the target location using a motion estimation neural network to generate the predicted future trajectory.

In some implementations, the system processes the encoded representation and data specifying the corresponding initial target location using a target prediction neural network to generate a target prediction output that includes the respective predicted likelihood score.

In some implementations, each target location is the same as the corresponding initial target location.

In some implementations, the target prediction output further includes data defining an offset for the corresponding initial target location, and the target location is a location that is generated by applying the offset to coordinates of the initial target location. In some implementations, the data defining the offset includes, for each coordinate of the initial target location, parameters of respective probability distributions over offsets for the coordinate, and the system generates the offset by sampling from the respective probability distributions. In some implementations, the data defining the offset includes, for each coordinate of the initial target location, a respective offset for the coordinate.

In some implementations, when selecting the one or more of the predicted future trajectories, the system generates a respective refined score for each of the predicted future trajectories that represents a likelihood that the predicted future trajectory will be the future trajectory of the agent after the current time point given the scene context data, and selects one or more of the predicted future trajectories based on the refined scores. In some implementations, when generating a respective refined score for each of the predicted future trajectories, the system processes the encoded representation and the predicted future trajectory using a trajectory scoring neural network to generate the respective refined score for the predicted trajectory.

In some implementations, when selecting one or more of the predicted future trajectories, the system first orders the predicted future trajectories according to the respective refined scores. Then, for each predicted future trajectory starting from a first predicted trajectory in the order and until a specified number of trajectories have been selected, the system determines whether the predicted trajectory is more than a threshold distance distant from all trajectories that have already been selected according to a distance metric, and selects the predicted trajectory only if the predicted trajectory is more than a threshold distance distant from all trajectories that have already been selected according to a distance metric.

In some implementations, the scene context data is generated from one or more sensors of a vehicle navigating through the environment.

In some implementations, the system further provides the likely trajectories to a planning system of the vehicle to generate planning decisions that plan a future trajectory of the vehicle. In some implementations, each predicted future trajectory includes a respective predicted state for each of a fixed number of future time points that are after the current time point, wherein each respective predicted state identifies at least a predicted location of the agent at the future time point.

In some implementations, each respective predicted state further includes one or more of a predicted orientation of the agent at the future time point or a predicted velocity of the agent at the future time point. In some implementations, for each target location, the respective predicted state for the last future time point in the predicted future trajectory for the target location identifies the target location.

There is also provided a system including one or more computers and one or more storage devices storing instructions that when executed by the one or more computers cause the one or more computers to perform the method described above.

There is also provided one or more computer storage media storing instructions that when executed by one or more computers, cause the one or more computers to perform the method described above.

The subject matter described in this specification can be implemented in particular embodiments so as to realize one or more of the following advantages.

Predicting the future behaviors of moving agents is essential for real-world applications in robotics and autonomous driving. It is challenging, however, as the intents of different agents are unknown yet related, leading to highly multimodal distributions of future behaviors. For example, a vehicle commonly has a multimodal distribution of futures: it could turn, go straight, slow down, speed up, and so on. Depending on other scene elements, it could pass, yield, change lanes, or pull into a driveway.

This specification introduces the notion of targets, which is a quantized set of future states, such as locations, a fixed time horizon into the future. Compared with latent intents, targets offer a more attractive option due to their interpretability, which gives the model designer better control over mode diversity. Compared with explicit representations like full trajectories, targets are higher level and usually easier to discretize. Moreover, in practice, the choice of targets can easily incorporate relevant scene context like the road topography and traffic light states.

By introducing targets, the mode prediction problem is cast into predicting a distribution over target states and then formulating a probabilistic model in which trajectory estimation and likelihood are conditioned on such targets. This decomposes the problem into three stages: (1) target prediction, which estimates a discrete-continuous distribution over candidate targets given observation; (2) target conditioned motion estimation, which predicts the state sequences or their distributions towards each of the targets; and (3) trajectory scoring and selection, which estimates the likelihoods of predicted trajectories and selects a final diversified set of predictions. This results in agent trajectory predictions that are highly accurate, even in environments where the future behavior of agents is highly multimodal.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods, computer systems, and apparatus, including computer programs encoded on computer storage media, for generating a trajectory prediction for an agent, e.g., a vehicle, a cyclist, or a pedestrian, in an environment.

Figure 1:
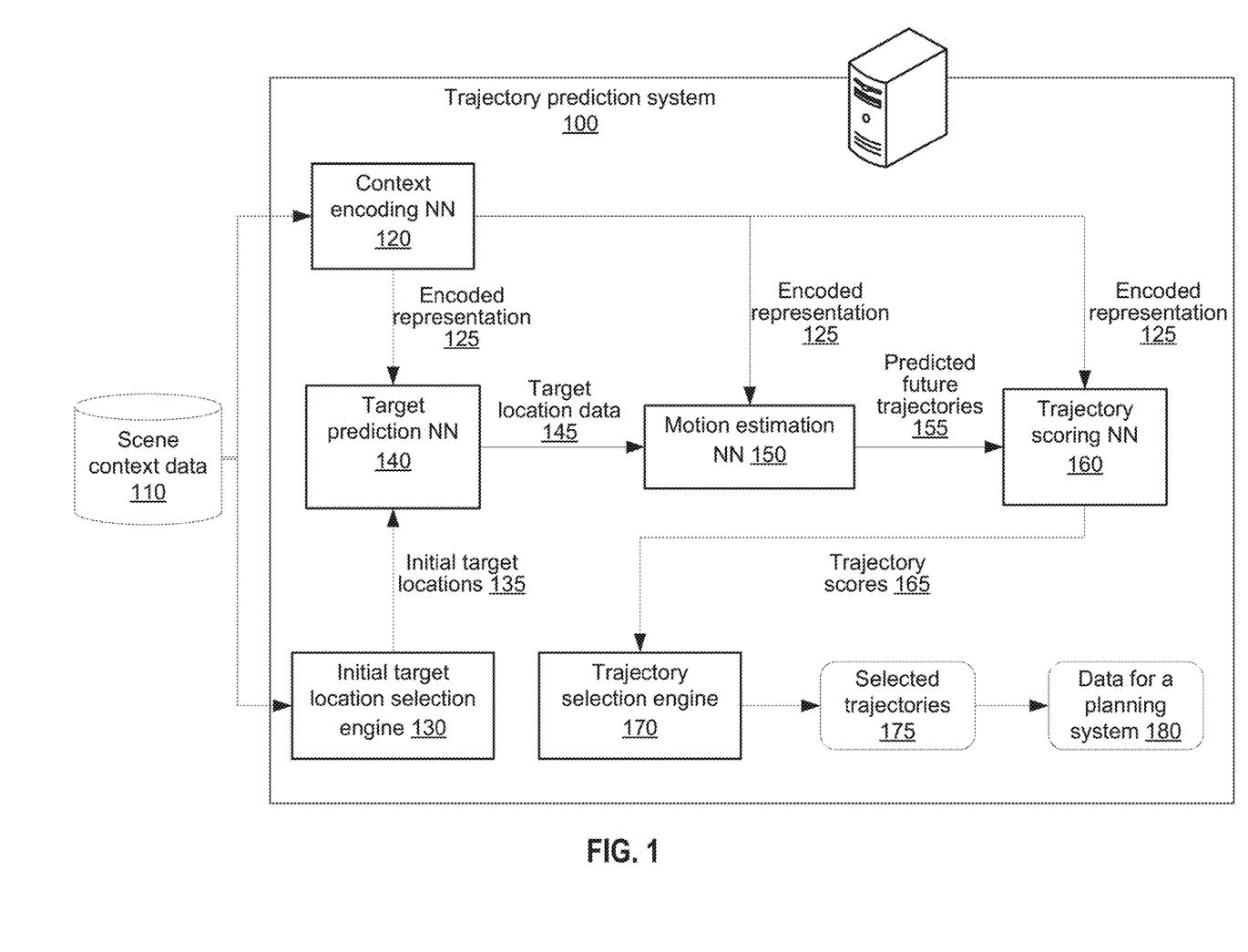
FIG. 1 shows an example trajectory prediction system.

FIG. 1 shows an example of a trajectory prediction system 100. The system 100 is an example of a system implemented as computer programs on one or more computers in one or more locations, in which the systems, components, and techniques described below can be implemented.

In general, the system 100 processes scene context data 110 characterizing an environment, and predicts likely future trajectories for an agent (e.g., a vehicle, a cyclist, or a pedestrian) in the environment. For example, the agent can be in a vicinity of a vehicle, e.g., an autonomous vehicle navigating through the environment. The trajectory prediction can be made by an on-board computer system of the autonomous vehicle and the agent can be an agent that has been detected by the sensors of the autonomous vehicle. The trajectory prediction identifies one or more likely future trajectories 180 for the agent. A planning system of the vehicle can use the likely future trajectories 180 for the agent to make planning decisions to plan a future trajectory of the vehicle, e.g., by generating or modifying the future trajectory to avoid collisions with any of the likely future trajectories of the agent or otherwise modifying the future trajectory of the vehicle to account for the likely future behavior of the agent.

The scene context data 110 includes data that characterizes a trajectory of the agent in an environment up to a current time point. In some implementations, the context data can be generated by one or more sensors of an autonomous vehicle. For example, the sensors (e.g., cameras and LiDAR detectors) of an autonomous vehicle can detect one or more agents, e.g., other vehicles or pedestrians, in the vicinity of the autonomous vehicle. The sensors can track the positions of the other vehicles or pedestrians up to the current time point and generate trajectory data for those agents. The trajectory data can be part of the scene context data for the trajectory prediction system.

In some implementations, to capture the agent's interaction with other agents in the environment, the scene context data 110 further includes data indicating trajectories of other agents in the environment.

To further capture the agent's interaction with the environment, the scene context data can also include data indicating scene elements in the environment, such as lanes and traffic signs in the scene. For example, the scene context data 110 can include road graph data that indicates the positions of lanes, cross-sections, traffic lights, road signs, etc., in the environment.

In some implementations, the data indicating the scene elements can be obtained from the sensors of the vehicle, e.g., from the camera and/or LiDAR images obtained by the vehicle sensors. In some other implementations, the data indicating the scene elements can be obtained from available maps or aerial images of the environment.

In an example, the system 100 converts the data indicating the scene elements and agent trajectories into a set of polylines and vectors. Each vector can be represented as [$p_s$, $p_e$, f, $id_p$], where $p_s$ and $p_e$ are the start point and end point of the vector, f is a feature vector, which can contain feature type like lane state, and $id_p$ is the polyline index that the vector belongs to. The system can normalize the vector coordinates to be centered around the location of the agent at the last observed time step. The system uses the vectorized representation of the scene context data as input in the subsequent processing steps.

The system 100 processes the scene context data 100 using the context encoding neural network 120 to generate an encoded representation 125 of the scene context data.

The context encoding neural network 120 can have any suitable architectures. In one example, map data is available and is included in the scene context data 110. The system 100 uses a hierarchical graph neural network to encode the vectorized representation of the scene context data 110. An example of a hierarchical graph neural network is described in more detail in "VectorNet: Encoding HD Maps and Agent Dynamics from Vectorized Representation" Gao et al. in arXiv: 2005.04259 [cs.CV]. Briefly, the context encoding neural network 120 includes a subgraph network that encodes each of a plurality of polylines in the vectorized representation of the scene context data. Each polyline includes a variable number of vectors. The context encoding neural network 120 further includes a graph neural network to model the interactions between the polylines. The output of the context encoding neural network 120 is an encoded context feature x for the agent.

In another example, the scene context data 110 is represented as one or more images of the scene. For example, the scene context data 110 can include a top-down aerial photo of the environment. In this scenario, the context encoding neural network 120 can be a convolutional neural network (e.g., a ResNet) that encodes the imagery data to generate the encoded representation 125.

The initial target location selection engine 130 identifies a plurality of initial target locations in the environment. A target location is a likely intended final location of a future trajectory of the agent starting from the current time point. The initial target locations are locations the system 100 selects as candidates for the target locations.

Briefly, in some implementations, the initial target location selection engine 130 divides a region of the environment that is in the vicinity of the agent into a grid having a plurality of grid points, and selects at least some of the grid points in the grid as initial target locations.

In some other implementations, the initial target location selection engine 130 obtains road graph data identifying lanes on one or more roads in the environment, and samples, as initial target locations, points from the identified lanes. For example, for each identified lane, the system can sample points on a lane center line of the identified lane. Examples of selecting initial target locations will be discussed in more detail below with reference to FIG. 2C.

The system 100 uses the target prediction neural network 140 to process the encoded representation 125 and data specifying the initial target locations 135 to generate a target prediction output 145 for a plurality of target locations. The target prediction output 145 includes respective predicted likelihood scores for each of the target locations. The respective predicted likelihood score for a given target location represents the likelihood that the target location will be the intended final location for a future trajectory of the agent starting from the current time point.

Generally, each of the plurality of target locations corresponds to one of the initial target locations. In some implementations, each of the target locations is the same as the corresponding initial target location. In some other implementations, the target prediction output 145 further includes, for each of the plurality of target locations, data defining an offset for the corresponding initial target location. The data defining the offset includes, for each coordinate of the initial target location, a respective offset for the coordinate. In this case, the target location is a location that is generated by applying the offset to coordinates of the corresponding initial target location.

For example, the data defining the offset can include, for each coordinate of the initial target location, parameters of respective probability distributions over offsets for the coordinate. The system 100 can then generate the offset by sampling from the respective probability distributions.

In one example, target locations $\tau$ are defined as the locations the agent is likely to be at a fixed time horizon T. In this context, the system 100 aims to provide a distribution of future targets of the agent ($\mathcal{T}$|x). The system 100 models the potential future targets via a set of N discrete, quantized locations with continuous offsets: $\mathcal{T}=\{\tau^n\}=\{(x^n, y^n)+(\Delta x^n, \Delta y^n)\}_{n=1}^N$. The coordinate $(x^n, y^n)$ represents the n-th initial target location. The distribution over the target locations can then be modeled via a discrete-continuous factorization:

$$p(\tau^n|x)=\pi(\tau^n|x)\cdot\mathcal{N}(\Delta x^n|v_x^n(x))\cdot\mathcal{N}(\Delta y^n|v_y^n(x)), \quad (1)$$

where $\pi(\tau^n|x)=\exp f(\tau^n, x)/\Sigma_\tau$, $\exp f(\tau, x)$ is a discrete distribution over location choices $(x^n, y^n)$. The terms $\mathcal{N}(\cdot||/(\cdot))$ denote a generalized normal distribution with Huber as the distance function. The mean of the distribution is denoted as $v(\cdot)$.

The system 100 can implement the Eq. (1) as the target prediction neural network 140. The functions $f(\cdot)$ and $v(\cdot)$ can be implemented with any appropriate trainable model, for example with a multilayer perceptron (MLP) neural network, with target coordinates $(x^k, y^k)$ and the scene context feature x as inputs. The output of the target prediction neural network 140 predicts a discrete distribution over target locations and their most likely offsets.

The loss function for training the model is given by $$L_{S1}=L_{cls}(\pi,u)+L_{offset}(\mathcal{U}_{x,Ly}^{\tau,\Delta x^u,\Delta y^u}), \quad (2)$$

where $L_{cls}$ is cross-entropy, $L_{offset}$ is the Huber loss; u is the target closest to the ground truth location, and $\Delta x^u$, $\Delta y^u$ are the spatial offsets of u from the ground truth. For each initial target location, the system 100 produces a tuple of $(\pi, \Delta x, \Delta y)$.

In some implementations, the system can first sample a large number of initial target locations as input to the target prediction neural network, e.g. N=1000, to increase the coverage of the potential future locations. Then, the system 100 can select a smaller number of outputs, e.g. M=50 based on the predicted likelihood scores, for further processing. For example, the system 100 can select a subset of the target locations by selecting a threshold number of target locations having the highest respective predicted likelihood scores.

The system uses the motion estimation neural network 150 to process the encoded representation 125 and data specifying the target locations 145 to generate the predicted future trajectories 155 for the target locations.

Specifically, for each target location in the subset of selected target locations, the system generates a predicted future trajectory for the agent. The predicted future trajectory for the agent is a prediction of the future trajectory of the agent given that the target location is the intended final location for the future trajectory.

In some implementations, each predicted future trajectory includes a respective predicted state for each of a fixed number of future time points that are after the current time point. Each respective predicted state identifies at least a predicted location of the agent at the future time point. The respective predicted state can further indicate other motion information of the agent at the time points, such as predicted heading direction and velocity. For each target location, the respective predicted state for the last future time point in the predicted future trajectory for the target location identifies the target location.

The motion estimation neural network 150 can be any appropriate neural network, such as an MLP neural network. In an example, the motion estimation neural network is a 2-layer MLP neural network. The neural network takes the encoded context feature x and a target location $\tau$ as input, and outputs one most likely future trajectory $[\hat{s}_1, \ldots, \hat{s}_T]$ per target location. During training, the loss term for motion estimation neural network is the distance between predicted states $\hat{s}_t$ and ground truth $s_t$:

$$\mathcal{L}_{S2} = \sum_{t=1}^T \mathcal{L}_{reg}(\hat{s}_t, s_t), \quad (3)$$

where $L_{reg}$ is implemented as Huber loss over per-step coordinate offsets.

In some implementations, each respective predicted state further includes one or more of a predicted orientation of the agent at the future time point or a predicted velocity of the agent at the future time point.

The system 100 uses the trajectory scoring neural network 160 to process the encoded representation and the predicted future trajectories to generate respective refined trajectory scores 165 for the predicted trajectories.

In an example, the system 100 uses a maximum entropy model to score all the M selected trajectories:

$$\varphi(s_F | x) = \frac{\exp(g(s_F, x))}{\sum_{m=1}^M \exp(g(s_F^m, x))}, \quad (4)$$

The system 100 can implement Eq. (4) as the trajectory scoring neural network 160. The function $g(\cdot)$ can be implemented as an MLP (e.g., a 2-layer MLP).

The loss term for training the trajectory scoring neural network 160 can be the cross-entropy between the predicted scores and ground truth scores, $$L_{S3}=L_{CE}(\varphi(S_F|X),\psi(S_F)), \quad (5)$$

where the ground truth score of each predicted trajectory is defined by its distance to ground truth trajectory $\psi(s_F)=\exp(-D(s,s_{GT})/\alpha)/\Sigma_s$, $\exp(-D(s', s_{GT})/\alpha)$, where $D(\cdot)$ is in meters and $\alpha$ is the temperature. The distance metric is defined as $(s^i, s^j)=\max(\|s_1^i-s_1^j\|_2^2\|s_t^i-s_t^j\|_2^2$.

The trajectory selection engine 170 selects one or more predicted future trajectories 175 based on the refined scores. In some implementations, the trajectory selection engine 170 adopts a trajectory selection strategy to reject near-duplicate trajectories. Concretely, the trajectory selection engine 170 can first sort the predicted future trajectories according to the respective refined scores, e.g., in descending order. Next, for each predicted future trajectory starting from a first predicted trajectory in the order and until a specified number of trajectories (e.g., K trajectories) have been selected, the trajectory selection engine 170 determines whether the predicted trajectory is more than a threshold distance from all trajectories that have already been selected according to a distance metric, and selects the predicted trajectory only if the predicted trajectory is more than a threshold distance distant from all trajectories that have already been selected according to a distance metric. In some implementations, the trajectory selection engine 170 can use the same distance metric used in the scoring process.

The target prediction neural network 140, the motion estimation neural network 150, and the trajectory scoring neural network 160 can be trained in an end-to-end training process, with a total loss function $$L=\lambda_1 L_{si}+\lambda_2 L_{S2}+\lambda_3 L_{S3}, \qquad (6)$$

where $\lambda_1$, $\lambda_2$, $\lambda_3$ are chosen to balance the training process. In other words, the neural networks 140, 150, and 160 can be trained jointly with a total loss that combines the respective independent losses of the three networks.

Figure 2A:
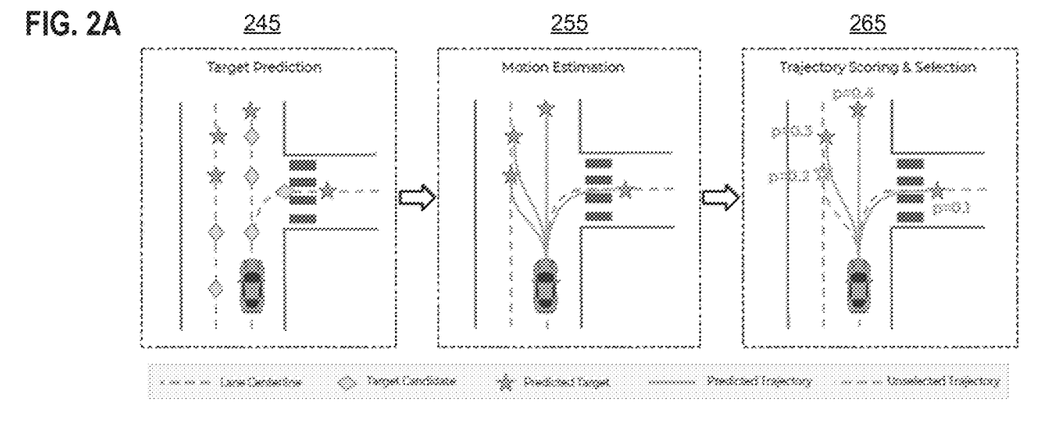
FIG. 2A shows an example process for predicting future trajectories for a vehicle.

FIG. 2A shows a process for predicting future trajectories for a vehicle. For convenience, the process will be described as being performed by a system of one or more computers located in one or more locations. For example, a trajectory prediction system, e.g., the trajectory prediction system 100 of FIG. 1, appropriately programmed in accordance with this specification, can perform the process to predict future trajectories of the vehicle.

In particular, FIG. 2A illustrates results in target prediction 245, motion estimation 255, and trajectory scoring and selection 265. The target prediction result 245 includes a set of target locations (stars) among all initial target locations (the set that includes both diamonds and stars). The motion estimation result 255 includes predicted trajectories toward each selected target location. The trajectory scoring and selection result 265 includes respective predicted refined scores for the selected target locations, and a selection of a final set of predicted trajectories according to the predicted refined scores.

Figure 2B:
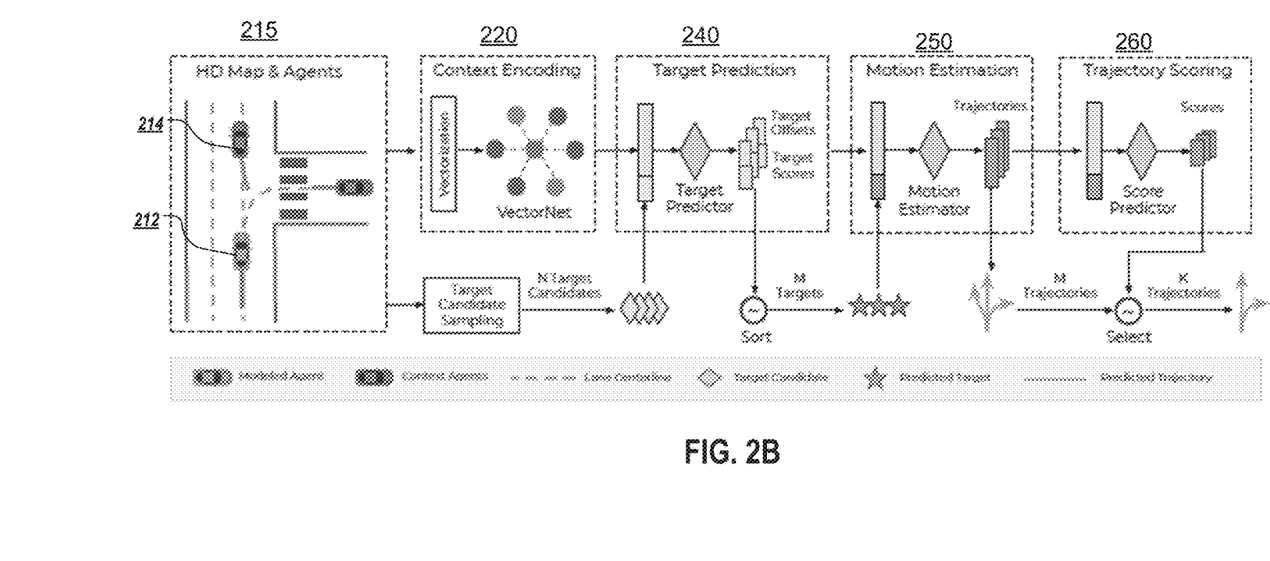
FIG. 2B shows an example process for predicting future trajectories for an agent in the environment.

FIG. 2B shows a process for predicting future trajectories for an agent, e.g., the vehicle 212 in the environment 215. There are one or more other agents ("context agents") (e.g., the vehicle 214) in the environment whose behavior can influence the future behavior of the agent 212.

For convenience, the process will be described as being performed by a system of one or more computers located in one or more locations. For example, a trajectory prediction system, e.g., the trajectory prediction system 100 of FIG. 1, appropriately programmed in accordance with this specification, can perform the process to predict future trajectories of the agent 212.

The process includes the steps of context encoding 220, target prediction 240, motion estimation 250, and trajectory scoring 260.

In context encoding 220, the system uses a first neural network (e.g., the context encoding neural network) to generate feature representation of scene context data.

In target prediction 240, the system uses a second neural network (e.g., the target prediction neural network), to generate respective predicted likelihood scores and target offsets for a set of target locations.

In motion estimation 250, the system uses a third neural network (e.g., the motion estimation neural network), to generate a predicted trajectory for each target location.

In trajectory scoring 260, the system generates respective predicted refined scores for the selected target locations and outputs a final set of K predicted trajectories.

Figure 2C:
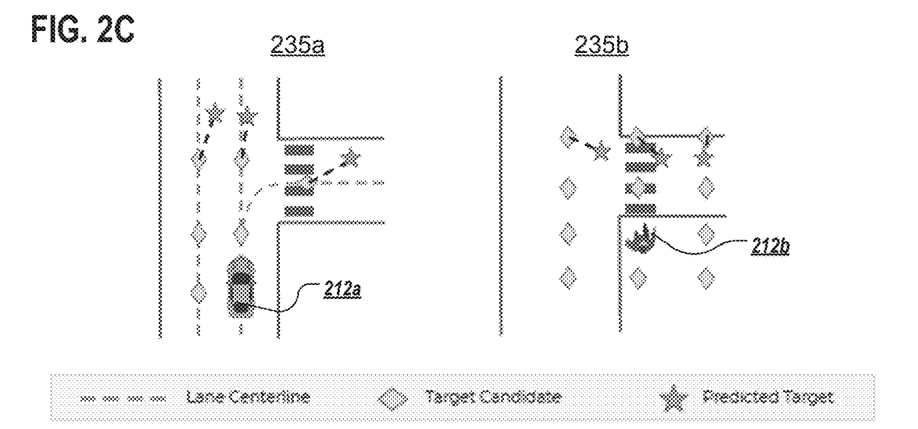
FIG. 2C shows examples of selected initial target locations for the agent.

FIG. 2C shows examples of selected initial target locations for the agent. For convenience, the selection process will be described as being performed by a system of one or more computers located in one or more locations. For example, a target selection engine, e.g., the initial target location selection engine 130 of FIG. 1, appropriately programmed in accordance with this specification, can perform the process to select the initial target locations.

In the first example 235a, the agent 212a is a vehicle. The target selection engine selects the initial target locations from the lane centerlines. In an example, the target selection engine can determine a closest lane to the agent by extrapolating using motion estimation based on the current location and the heading direction of the agent, and sample a plurality of points on the centerline of the closest lane as the initial target locations. The manner of sampling locations from the lane centerline depends on the specific application and the motion characteristics of the agent. In one example, the target selection engine samples at least one point every meter along the lane centerlines identified in the scene context data for the agent (a vehicle).

In the second example 235b, the agent 212b is a pedestrian. The target selection engine divides a region of the environment that is in a vicinity of the agent into a grid having a plurality of grid points, and selects at least some of the grid points in the grid as initial target locations. In an example, the target selection engine selects the grid points based on the current location and heading direction of the agent. The size and resolution of the grid can be selected according to the specific application and the motion characteristics of the agent. In one example, the target selection engine uses a uniform rectangular 2D grid (e.g. 10 m×10 m total size) around the agent (a pedestrian), with a cell size of 1 m×1 m (e.g. 1 m×1 m).

Figure 3:
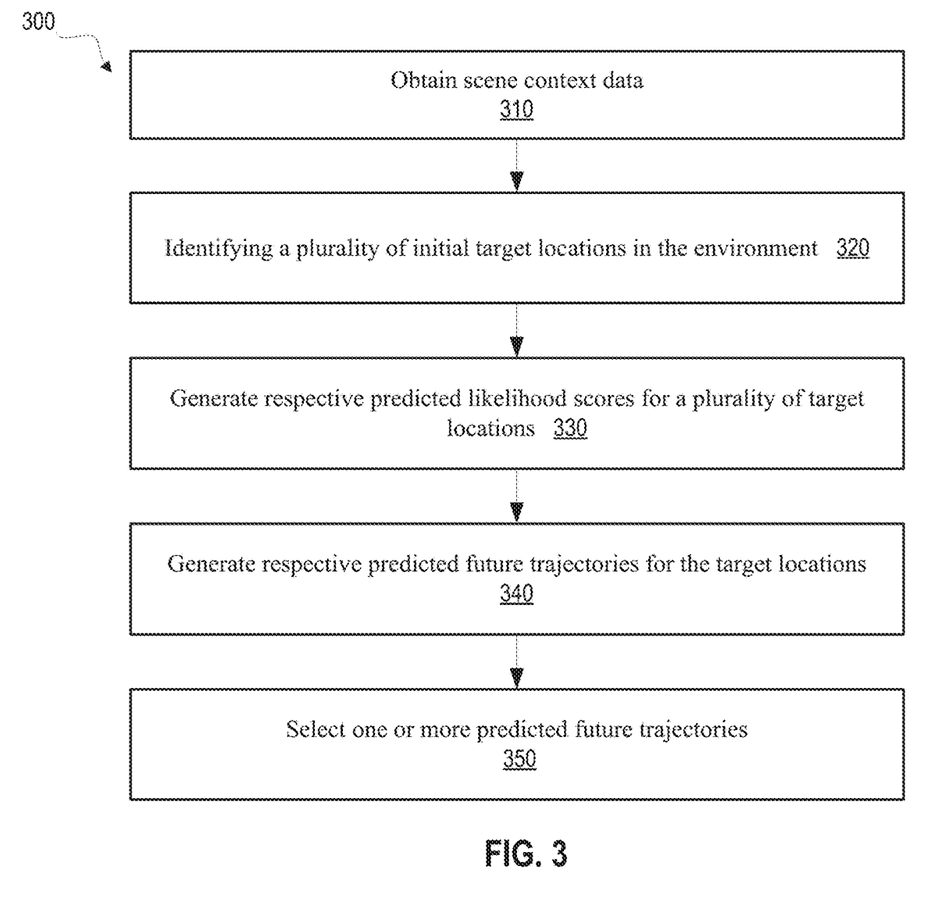
FIG. 3 is a flow diagram illustrating an example process for predicting future trajectories for an agent.

FIG. 3 is a flow diagram illustrating an example process 300 for predicting future trajectories of an agent. For convenience, the process 300 will be described as being performed by a system of one or more computers located in one or more locations. For example, a trajectory prediction system, e.g., the trajectory prediction system 100 of FIG. 1, appropriately programmed in accordance with this specification, can perform the process 300 to predict future trajectories of the agent.

In step 310, the system obtains scene context data characterizing an environment. The scene context data includes data that characterizes a trajectory of an agent in an environment up to a current time point. The agent can be in a vicinity of a vehicle, e.g., an autonomous vehicle, navigating the environment.

In some implementations, the context data can be generated by one or more sensors of the vehicle. For example, the sensors (e.g., cameras and LiDAR detectors) of an autonomous vehicle can detect one or more agents, e.g., other vehicles or pedestrians, in the vicinity of the autonomous vehicle. The sensors can track the positions of the other vehicles or pedestrians up to the current time point and generate trajectory data for those agents. The trajectory data can be part of the scene context data for the trajectory prediction system.

In some implementations, to capture the agent's interaction with other agents in the environment, the scene context data further includes data indicating trajectories of other agents in the environment. To further capture the agent's interaction with the environment, the scene context data also includes data indicating scene elements in the environment, such as lanes and traffic signs in the scene.

In some implementations, the data indicating the scene elements can be obtained from the sensors of the vehicles, e.g., from the camera and/or LiDAR images obtained by the vehicle sensors. In some other implementations, the data indicating the scene elements can be obtained from available maps or aerial images of the environment.

In step 320, the system identifies a plurality of initial target locations in the environment. Examples of selecting initial target locations are discussed with reference to FIG. 2C. Briefly, in some implementations, the system divides a region of the environment that is in the vicinity of the agent into a grid having a plurality of grid points, and selects at least some of the grid points in the grid as initial target locations. In some other implementations, the system obtains road graph data identifying lanes on one or more roads in the environment, and samples, as initial target locations, points from the identified lanes. For example, for each identified lane, the system can sample points on a lane center line of the identified lane.

In step 330, the system generates respective predicted likelihood scores for a plurality of target locations. Each of the plurality of target locations corresponds to one of the initial target locations. The respective predicted likelihood score for a given target location represents a likelihood that the target location will be an intended final location for a future trajectory of the agent starting from the current time point.

Details of generating the respective predicted likelihood scores for the target locations according to certain implementations will be discussed with reference to FIG. 4. Briefly, in some implantations, each target location is the same as the corresponding initial target location. That is, the system generates respective predicted likelihood scores for the initial target locations to predict the likelihood that a specific initial target location will be an intended final location for a future trajectory of the agent starting from the current time point. In some other implementations, one or more of the target locations eave have respective offsets from the corresponding initial target locations, and the system predicts the respective offsets as well as the likelihood scores.

In step 340, the system generates respective predicted future trajectories for the target locations. Specifically, for each target location in a subset of the target locations, the system generates a predicted future trajectory for the agent. The predicted future trajectory for the agent is a prediction of the future trajectory of the agent given that the target location is the intended final location for the future trajectory.

In some implementations, each predicted future trajectory includes a respective predicted state for each of a fixed number of future time points that are after the current time point. Each respective predicted state identifies at least a predicted location of the agent at the future time point. For each target location, the respective predicted state for the last future time point in the predicted future trajectory for the target location identifies the target location.

In some implementations, each respective predicted state further includes one or more of a predicted orientation of the agent at the future time point or a predicted velocity of the agent at the future time point.

In some implementations, the subset of target locations is a proper subset of the plurality of target locations. The system selects the subset of target locations by selecting a threshold number of target locations having the highest respective predicted likelihood scores.

Details of generating the respective predicted future trajectories for the target locations according to certain implementations will be discussed with reference to FIG. 4.

In step 350, the system selects one or more predicted future trajectories as likely future trajectories of the agent.

In some implementations, the system generates a respective refined score for each of the predicted future trajectories that represents a likelihood that the predicted future trajectory will be the future trajectory of the agent after the current time point given the scene context data; and selects one or more of the predicted future trajectories based on the refined scores.

For example, when selecting one or more of the predicted future trajectories, the system can first sort the predicted future trajectories according to the respective refined scores. Next, for each predicted future trajectory starting from a first predicted trajectory in the order and until a specified number of trajectories have been selected, the system determines whether the predicted trajectory is more than a threshold distance distant from all trajectories that have already been selected according to a distance metric, and selects the predicted trajectory only if the predicted trajectory is more than a threshold distance distant from all trajectories that have already been selected according to a distance metric.

Figure 4:
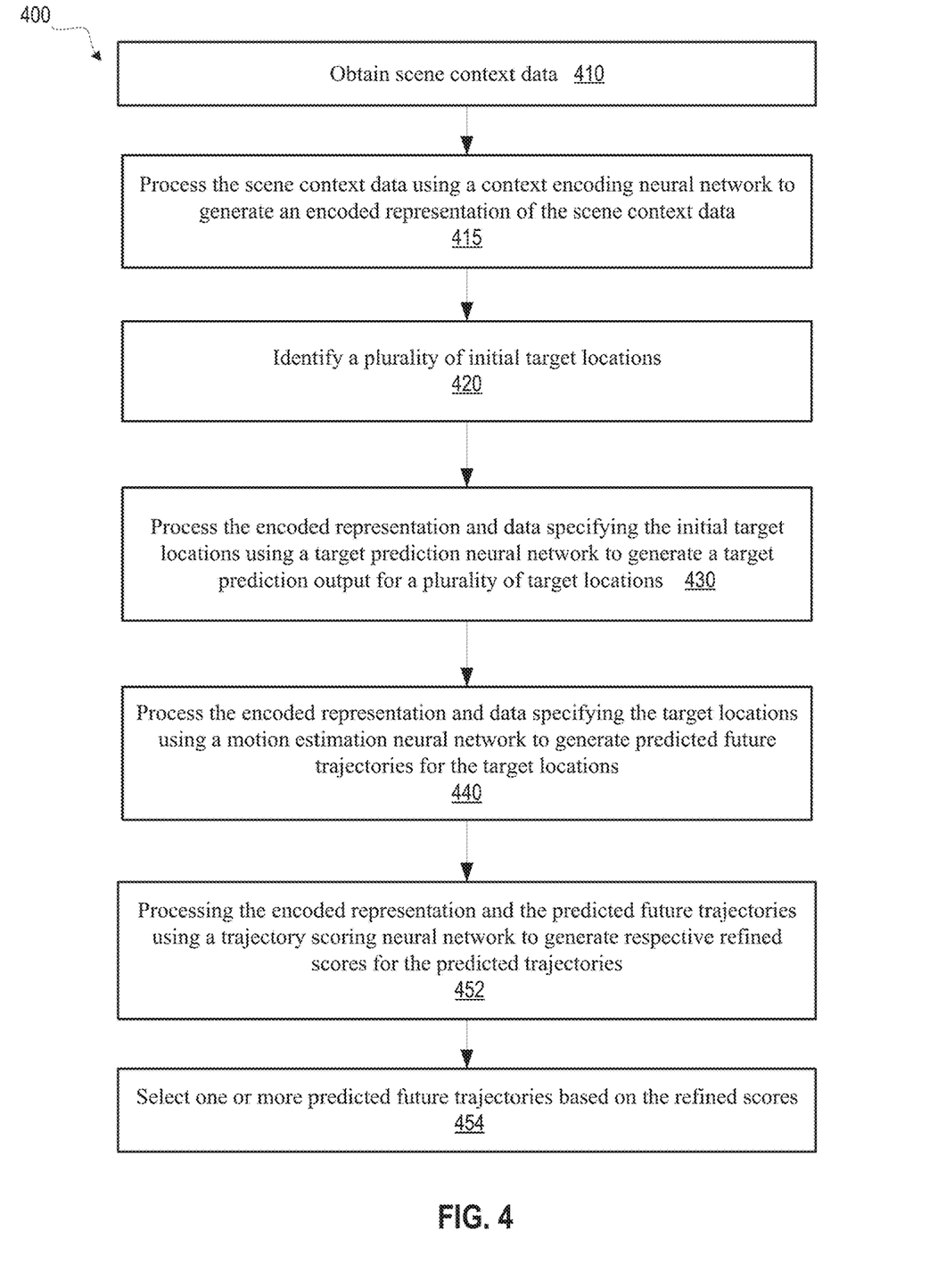
FIG. 4 is a flow diagram illustrating another example process for predicting future trajectories for an agent.

FIG. 4 is a flow diagram illustrating another example process 400 for predicting future trajectories of an agent. For convenience, the process 400 will be described as being performed by a system of one or more computers located in one or more locations. For example, a trajectory prediction system, e.g., the trajectory prediction system 100 of FIG. 1, appropriately programmed in accordance with this specification, can perform the process 400 to predict future trajectories of the agent.

In step 410, the system obtains scene context data characterizing an environment. The scene context data includes data that characterizes a trajectory of an agent in an environment up to a current time point. The agent can be in a vicinity of a vehicle, e.g., an autonomous vehicle, navigating the environment.

In some implementations, the context data can be generated by one or more sensors of the vehicle. For example, the sensors (e.g., cameras and LiDAR detectors) of an autonomous vehicle can detect one or more agents, e.g., other vehicles or pedestrians, in the vicinity of the autonomous vehicle. The sensors can track the positions of the other vehicles or pedestrians up to the current time point and generate trajectory data for those agents. The trajectory data can be part of the scene context data for the trajectory prediction system.

In some implementations, to capture the agent's interaction with other agents in the environment, the scene context data further includes data indicating trajectories of other agents in the environment. To further capture the agent's interaction with the environment, the scene context data also includes data indicating scene elements in the environment, such as lanes and traffic signs in the scene.

In some implementations, the data indicating the scene elements can be obtained from the sensors of the vehicles, e.g., from the camera and/or LiDAR images obtained by the vehicle sensors. In some other implementations, the data indicating the scene elements can be obtained from available maps or aerial images of the environment.

In step 415, the system processes the scene context data using a context encoding neural network to generate an encoded representation of the scene context data.

The system can use any suitable context encoder to encode the scene context data. In one example, map data is available and is included in the scene context data. The system generates the vectorized representation of the scene context data and uses a hierarchical graph neural network to encode the vectorized representation. Briefly, the system applies a subgraph network to encode each of a plurality of polylines in the vectorized representation of the scene context data. Each polyline includes a variable number of vectors. The system further uses a global graph to model the interactions between polylines. The output is an encoded context feature x for each modeled agent.

In another example, the scene context data is represented as one or more images of the scene. For example, the scene context data can include a top-down aerial photo of the environment. In this scenario, the context encoding neural network can be a convolutional neural network (e.g., a ResNet) that encodes the imagery data to generate the encoded representation.

In step 420, the system identifies a plurality of initial target locations in the environment. Examples of selecting initial target locations are discussed with reference to FIG. 2C. Briefly, in some implementations, the system divides a region of the environment that is in the vicinity of the agent into a grid having a plurality of grid points, and selecting at least some of the grid points in the grid as initial target locations. In some other implementations, the system obtains road graph data identifying lanes on one or more roads in the environment, and samples, as initial target locations, points from the identified lanes. For example, for each identified lane, the system can sample points on a lane center line of the identified lane.

In step 430, the system processes the encoded representation and data specifying the initial target locations using a target prediction neural network to generate a target prediction output for a plurality of target locations. The target prediction output includes the respective predicted likelihood scores for the target locations. Each of the plurality of target locations corresponds to one of the initial target locations. The respective predicted likelihood score represents a likelihood that the target location will be an intended final location for a future trajectory of the agent starting from the current time point.

In some implementations, the target prediction output further includes data defining an offset for the corresponding initial target location. The data defining the offset includes, for each coordinate of the initial target location, a respective offset for the coordinate. The target location is a location that is generated by applying the offset to coordinates of the initial target location.

For example, the data defining the offset can include, for each coordinate of the initial target location, parameters of respective probability distributions over offsets for the coordinate. The system can further generate the offset by sampling from the respective probability distributions.

In some implementations, the system can first sample a large number of initial target locations as input to the target prediction neural network, e.g. N=1000, to increase the coverage of the potential future locations. Then, the system can select a smaller number of outputs, e.g. M=50 based on the predicted likelihood scores, for further processing. For example, the system can select a subset of the target locations by selecting a threshold number of target locations having the highest respective predicted likelihood scores.

In step 440, the system processes the encoded representation and data specifying the target locations using a motion estimation neural network to generate predicted future trajectories for the target locations. Specifically, for each target location in a subset of the target locations, the system generates a predicted future trajectory for the agent. The predicted future trajectory for the agent is a prediction of the future trajectory of the agent given that the target location is the intended final location for the future trajectory.

In some implementations, each predicted future trajectory includes a respective predicted state for each of a fixed number of future time points that are after the current time point. Each respective predicted state identifies at least a predicted location of the agent at the future time point. For each target location, the respective predicted state for the last future time point in the predicted future trajectory for the target location identifies the target location.

The motion estimation neural network can be any appropriate neural network, such as an MLP neural network. In an example, the motion estimation neural network is a 2-layer MLP neural network. The neural network takes the encoded context feature x and a target location $\tau$ as input, and outputs one most likely future trajectory $[\hat{s}_1, \ldots, \hat{s}_T]$ per target location.

In some implementations, each respective predicted state further includes one or more of a predicted orientation of the agent at the future time point or a predicted velocity of the agent at the future time point.

In step 452, the system processes the encoded representation and the predicted future trajectories using a trajectory scoring neural network to generate respective refined scores for the predicted trajectories. The trajectory scoring neural network can be any appropriate neural network. In one example, the trajectory scoring neural network is an MLP neural network.

In step 454, the system selects one or more predicted future trajectories based on the refined scores.

In some implementations, the system adopts a trajectory selection strategy to reject near-duplicate trajectories. Concretely, the system can first sort the predicted future trajectories according to the respective refined scores, e.g., in descending order. Next, for each predicted future trajectory starting from a first predicted trajectory in the order and until a specified number of trajectories (e.g., K trajectories) have been selected, the system determines whether the predicted trajectory is more than a threshold distance from all trajectories that have already been selected according to a distance metric, and selects the predicted trajectory only if the predicted trajectory is more than a threshold distance distant from all trajectories that have already been selected according to a distance metric. In some implementations, the system can use the same distance metric used in the scoring process.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other units suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification, the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship between client and server arises by virtue of computer programs running on the respective computers and having a client-server relationship with each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated into a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claim is:

1. A method performed by one or more computers, the method comprising:
   obtaining scene context data characterizing an environment, the scene context data comprising data that characterizes a trajectory of an agent in a vicinity of a vehicle in an environment up to a current time point;
   identifying a plurality of initial target locations in the environment;
   generating, for each of a plurality of target locations that each corresponds to one of the initial target locations, (i) a respective predicted coordinate offset between the target location and the corresponding initial target location and (ii) a respective predicted likelihood score that represents a likelihood that the target location will be an intended final location for a future trajectory of the agent starting from the current time point;
   selecting a first subset of the target locations based on the respective predicted likelihood scores of the target locations;
   for each target location in the first subset of the target locations, generating a predicted future trajectory for the agent that is a prediction of the future trajectory of the agent given that the target location is the intended final location for the future trajectory;
   selecting, as likely future trajectories of the agent starting from the current time point, one or more of the predicted future trajectories; and
   controlling the vehicle using the one or more selected predicted future trajectories.

2. The method of claim 1, wherein the scene context data further comprises data that characterizes respective trajectories of one or more other agents in the environment up to the current time point.

3. The method of claim 1, wherein selecting the first subset of the target locations comprises selecting a threshold number of target locations having the highest respective predicted likelihood scores.

4. The method of claim 1, wherein identifying the plurality of initial target locations in the environment comprises:
   dividing a region of the environment that is in a vicinity of the agent into a grid having a plurality of grid points; and
   selecting at least some of the grid points in the grid as initial target locations.

5. The method of claim 1, wherein identifying the plurality of initial target locations in the environment comprises:
   obtaining road graph data identifying lanes on one or more roads in the environment; and
   sampling, as initial target locations, points from the identified lanes.

6. The method of claim 5, wherein sampling points from the identified lanes comprises:
   for each identified lane, sampling points on a lane center line of the identified lane.

7. The method of claim 1, further comprising:
   processing the scene context data using a context encoding neural network to generate an encoded representation of the scene context data.

8. The method of claim 7, wherein generating the predicted future trajectory for the agent that is a prediction of the future trajectory of the agent given that the target location is the intended final location for the future trajectory comprises:
   processing the encoded representation and data specifying the target location using a motion estimation neural network to generate the predicted future trajectory.

9. The method of claim 7, wherein generating, for each of a plurality of target locations that each corresponds to one of the initial target locations, (i) the respective predicted coordinate offset between the target location and the corresponding initial target location (ii) the respective predicted likelihood score comprises:
   processing the encoded representation and data specifying the corresponding initial target location using a target prediction neural network to generate a target prediction output that comprises the respective predicted likelihood score.

10. The method of claim 1, wherein the data defining the offset comprises, for each coordinate of the initial target location, parameters of respective probability distributions over offsets for the coordinate, and wherein the method further comprises generating the offset by sampling from the respective probability distributions.

11. The method of claim 1, wherein the data defining the offset comprises, for each coordinate of the initial target location, a respective offset for the coordinate.

12. The method of claim 7, wherein selecting, as likely future trajectories of the agent starting from the current time point, one or more of the predicted future trajectories comprises:
  generating a respective refined score for each of the predicted future trajectories that represents a likelihood that the predicted future trajectory will be the future trajectory of the agent after the current time point given the scene context data; and
  selecting one or more of the predicted future trajectories based on the refined scores.

13. The method of claim 12, wherein generating a respective refined score for each of the predicted future trajectories that represents a likelihood that the predicted future trajectory will be the future trajectory of the agent after the current time point given the scene context data comprises:
  processing the encoded representation and the predicted future trajectory using a trajectory scoring neural network to generate the respective refined score for the predicted trajectory.

14. The method of claim 13, wherein selecting one or more of the predicted future trajectories comprises:
  ordering the predicted future trajectories according to the respective refined scores; and
  for each predicted future trajectory starting from a first predicted trajectory in the order and until a specified number of trajectories have been selected:
    determining whether the predicted trajectory is more than a threshold distance from all trajectories that have already been selected according to a distance metric; and
    selecting the predicted trajectory only if the predicted trajectory is more than a threshold distance from all trajectories that have already been selected according to a distance metric.

15. A system comprising:
  one or more computers; and
  one or more storage devices storing instructions that, when executed by the one or more computers, cause the one or more computers to perform:
    obtaining scene context data characterizing an environment, the scene context data comprising data that characterizes a trajectory of an agent in a vicinity of a vehicle in an environment up to a current time point;
    identifying a plurality of initial target locations in the environment;
    identifying a plurality of initial target locations in the environment;
    generating, for each of a plurality of target locations that each corresponds to one of the initial target locations, (i) a respective predicted coordinate offset between the target location and the corresponding initial target location and (ii) a respective predicted likelihood score that represents a likelihood that the target location will be an intended final location for a future trajectory of the agent starting from the current time point;
    selecting a first subset of the target locations based on the respective predicted likelihood scores of the target locations;
    for each target location in the first subset of the target locations, generating a predicted future trajectory for the agent that is a prediction of the future trajectory of the agent given that the target location is the intended final location for the future trajectory;
    selecting, as likely future trajectories of the agent starting from the current time point, one or more of the predicted future trajectories; and
    controlling the vehicle using the one or more selected predicted future trajectories.

16. The system of claim 15, wherein the stored instructions cause the one or more computers to perform:
  processing the scene context data using a context encoding neural network to generate an encoded representation of the scene context data;
  processing the encoded representation and data specifying the corresponding initial target location using a target prediction neural network to generate a target prediction output that comprises the respective coordinate offset and the respective predicted likelihood score; and
  processing the encoded representation and data specifying the target location using a motion estimation neural network to generate the predicted future trajectory.

17. One or more non-transitory computer-readable storage media storing instructions that when executed by one or more computers cause the one or more computers to perform:
  obtaining scene context data characterizing an environment, the scene context data comprising data that characterizes a trajectory of an agent in a vicinity of a vehicle in an environment up to a current time point;
  identifying a plurality of initial target locations in the environment;
  generating, for each of a plurality of target locations that each corresponds to one of the initial target locations, (i) a respective predicted coordinate offset between the target location and the corresponding initial target location and (ii) a respective predicted likelihood score that represents a likelihood that the target location will be an intended final location for a future trajectory of the agent starting from the current time point;
  selecting a first subset of the target locations based on the respective predicted likelihood scores of the target locations;
  for each target location in the first subset of the target locations, generating a predicted future trajectory for the agent that is a prediction of the future trajectory of the agent given that the target location is the intended final location for the future trajectory;
  selecting, as likely future trajectories of the agent starting from the current time point, one or more of the predicted future trajectories;
  and controlling the vehicle using the one or more selected predicted future trajectories.

18. The one or more computer-readable storage media of claim 17, wherein the stored instructions cause the one or more computers to perform:
  processing the scene context data using a context encoding neural network to generate an encoded representation of the scene context data;
  processing the encoded representation and data specifying the corresponding initial target location using a target prediction neural network to generate a target prediction output that comprises the respective coordinate offset and the respective predicted likelihood score; and processing the encoded representation and data specifying the target location using a motion estimation neural network to generate the predicted future trajectory.

* * * * *